Patented July 16, 1940

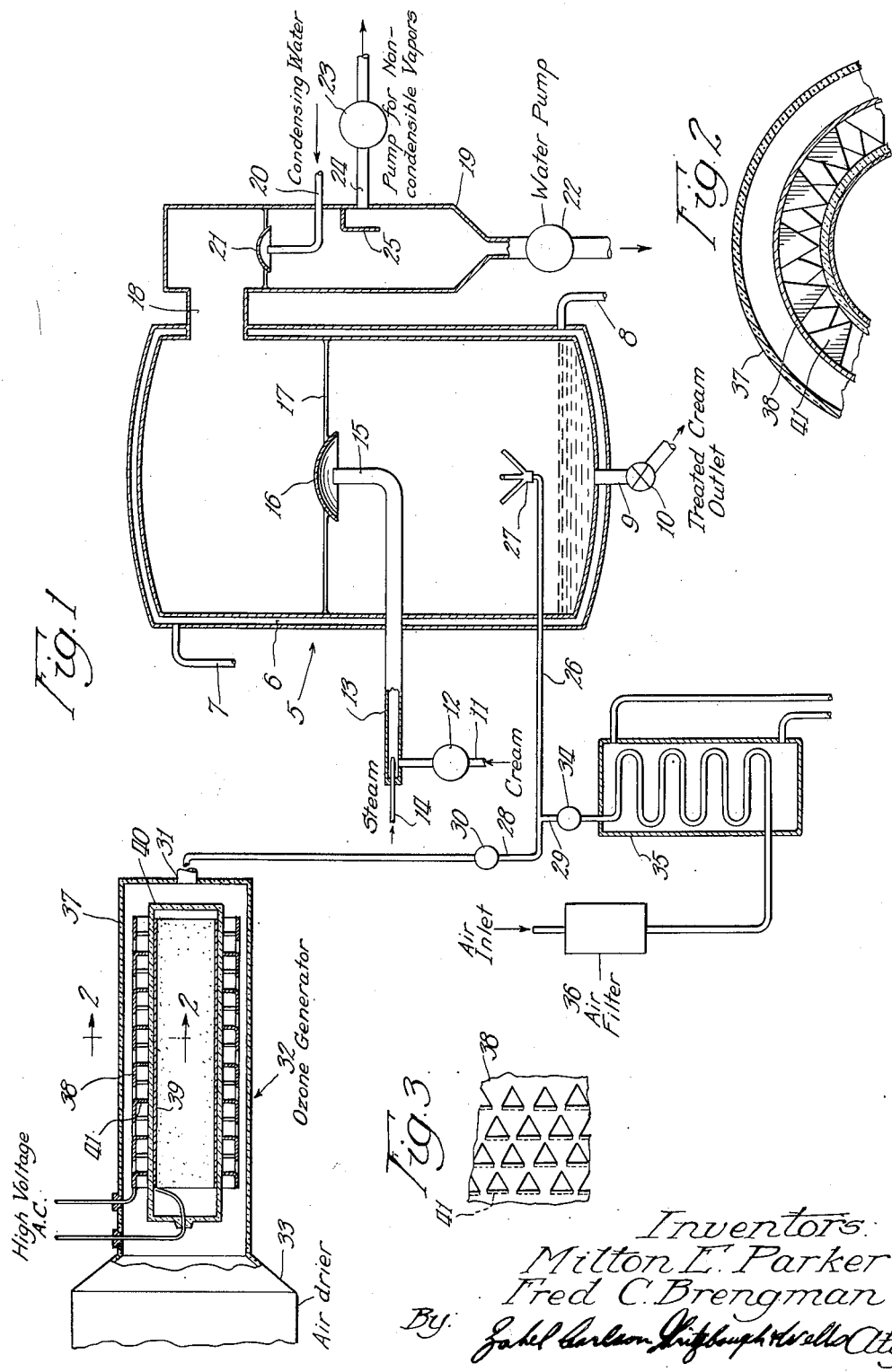

2,207,817

UNITED STATES PATENT OFFICE 2,207,817

TREATMENT OF MILK PRODUCTS

Milton E. Parker, Barrington, and Fred C. Brengman, Elmhurst, Ill., assignors to Beatrice Creamery Company, Chicago, Ill., a corporation of Delaware Application June 23, 1938, Serial No. 215,382

9 Claims. (Cl. 99—61)

The present invention relates to the deodorization of milk products such as cream, milk, etc. It is well known that objectionable flavors are found in cows' milk which are due to the type of feed consumed. For example, certain weeds such as peppergrass, when eaten by the cows, cause a variable contamination of the milk or cream by odors and flavors which are decidedly objectionable. The objectionably flavored compounds which are found in such tainted milk or cream include certain substances which, in their characteristic odors and chemical properties, indicate the presence of such compounds as mercaptans, indoles and skatoles. The substances generally are soluble in milkfat but are insoluble in milk serum or water and impart a distinctly obnoxious odor and taste to the tainted milk product. The substances appear to be carried primarily in the fatty constituents of milk and cream, and they naturally therefore appear most noticeably in butter and concentrated milkfat products such as cream. While some of these substances may be partially volatilized at the pasteurizing temperatures normally employed, others boil at temperatures as high as 450° F. It is desirable, therefore, to provide some method of treatment which will accomplish the removal of such substances, whether they be in the liquid or vapor phase.

It is the purpose of the present invention to provide a method of treating the milk or cream by which the deleterious odors due to the substances hereinabove referred to may be eliminated and the quality of the resulting cream or butter made from the treated cream may be improved not only as to freedom from bad odors and taste, but also as to its keeping qualities.

We have found that by treatment of the milk product in accordance with a definite method during which the milk product is pasteurized and then cooled by expanding it in a vacuum chamber we are able to convert the undesirable substances into a form which enables us to remove them from the milk product without otherwise adversely affecting it, and in fact with certain improvements in the resulting butter made from it, where the milk product treated is cream. In carrying out the invention as applied to cream in particular, we prefer to pasteurize the cream by introducing steam into it so as to raise the temperature of the cream to between 250° and 300° F. and then expand it in a vacuum chamber maintained at a vacuum of 15 to 18 inches. The resulting temperature in the vacuum chamber may be in the neighborhood of 165° to 185° F.

The best results are obtained by avoiding high vacuum and consequent lower temperatures in the expansion chamber, although advantages sometimes accrue from the use of vacua lower than 15 inches.

In the preliminary treatment of the cream, prior to its introduction into the pasteurizing apparatus, it is desirable that the cream, if sour, be adjusted in acidity. We have found that our best results are obtained when the cream is treated until there is a reduction of acidity to .15 to .20% as lactic acid. The particular neutralizer used also affects the ultimate results we are able to obtain. For example, when we use so-called lime neutralizers which are of the calcium or magnesium type to adjust the acidity before deodorizing, we find it more of a problem to remove the flavors due to some combination with, or action upon, the substances present in the cream being treated. The exact nature of this combination or action of the neutralizer with the substances is not fully understood.

However, we do find that when soda neutralizers such as bicarbonate, hydrate and carbonate of soda are used, such difficulty is avoided. It is, of course, possible to employ the deodorizing treatment prior to the acidity adjustment treatment of the cream. It does appear, however, from our experiments, that better results are obtained by acidity adjustment before applying the deodorization treatment. Flavors of sulfonic acids are much more noticeable in the butter made from treated cream which has been deodorized before adjustment of its acidity than is the case with cream whose acidity is adjusted before being given the deodorizing treatment.

The method by which the substances are eliminated from the cream is by means of oxidation of the tainted cream while in a dispersed condition. The cream is mixed with steam under pressure and then discharged into a reduced pressure (vacuum) chamber. This treatment releases the cream and steam mixture in the chamber in a finely divided state so that the odor producing substances may be readily and adequately oxidized due to the greatly enhanced exposure of the cream particles under treatment. The oxidation is accomplished by the introduction into the vacuum chamber of nascent oxygen which is capable of reacting quickly with the odor producing substances in the cream which is being released in a finely divided state in the vacuum chamber. The nascent oxygen may be derived from any suitable source. We have found that a practical and effective manner of obtaining the oxidizing agent is by the introduction of ozone into the lower part of the vacuum chamber, from which it is drawn upwardly in a direction counter to the direction of the falling particles of cream. One practical method of introducing the oxidizing agent is to dry and filter ordinary air, then pass the same through an ozone generating structure wherein the flow of air is through a static field of electricity created by imposing high potential differences between two metal plates separated by a dielectric. The air thus treated to form ozone is drawn into the lower part of the vacuum chamber without the necessity of any pumping apparatus other than that used to maintain the requisite reduced pressure in the vacuum chamber. It is desirable at times to have a substantial dilution of the ozone and the degree of dilution is controlled so that only the necessary amount of nascent oxygen may be supplied.

The necessary equipment for carrying out the invention is shown in the drawing, wherein, Fig. 1 is a diagrammatic view, partly in section, of the assembled equipment;

Fig. 2 is a fragmentary sectional view taken on line 2—2 of Fig. 1, and

Fig. 3 is a fragmentary plan view of part of the ozone generator.

Referring now to the drawing, Fig. 1 illustrates more or less diagrammatically a construction by which the present invention may be carried out. In this figure, the number 5 represents a vacuum tank having a jacketed wall 6 which may be heated by circulating a heating fluid through it from the pipe 7 to the pipe 8. The vacuum chamber has an outlet 9 at the bottom, controlled by a valve 10 so that the treated cream or milk product can be drawn off from the vacuum chamber. The cream is introduced into a pipe 11 having a pump 12 therein so as to supply the cream to a conduit 13 under pressure. Steam is injected into this conduit through a nozzle 14 from a suitable source. The mixture of steam and cream is discharged upwardly within the vacuum chamber through the upturned end 15 of the conduit 13. A deflector plate 16 deflects the cream downwardly and outwardly. The deflector is supported in any suitable fashion within the vacuum chamber, for example, as by a spider 17. The gases and vapors are drawn off from the vacuum chamber through an outlet 18 to a condensing chamber 19. This condensing chamber is supplied with condensing water through a pipe 20 which discharges condenser water upwardly against a deflector 21. The condensing water and the vapors condensed thereby are drawn from the chamber 19 by a pump 22. In addition, an air pump 23 is utilized to draw off the uncondensed vapors and gases from the chamber 19. A pipe 24 connects the pump 23 with the chamber 19. A baffle 25 is provided over the end of the pipe 24 to prevent water being drawn into the pump 23.

A pipe 26 enters the vacuum chamber 5 near the bottom and is provided with an upwardly directed spray head 27. The pipe 26 is fed from two branch pipes 28 and 29. The pipe 28 has a valve 30 therein and is connected to the outlet 31 of an ozone generator 32. The ozone generator 32 may receive its air through an air drier 33 (only partially shown) of any suitable construction. The pipe 29 has a valve 34 therein and passes through an air heating chamber 35. An air filter 36 may be provided at the inlet of the pipe 29 if desired.

The ozone generator 32 may be of any suitable type. The type shown is one wherein the air passes lengthwise through a tubular shell 37 which may be constructed of a suitable insulating material. Within the shell 37 there are two cylindrical metal electrodes 38 and 39 separated by a dielectric shield 40. The shield 40 preferably is a glass tube and the electrode 39 is made of metal foil lining the glass tube. The electrode 38 is a cylindrical shell having teeth 41 struck up from the metal of the shell and extending inwardly toward the tube 40. These teeth 41 are staggered, as shown best in Fig. 3.

In the operation of the apparatus just described, the required vacuum is maintained in the chamber 5 by means of the pumps 22 and 23. The pressure and temperature in the conduit 13 are controlled by means of the pump 12 and the steam supplied through the nozzle 14.

Air is drawn through the ozone generator 32 by the vacuum in the chamber 5. The ozonized air may be diluted as desired with air from the pipe 29 by adjusting the valves 30 and 34. It is desirable to supply just enough active or nascent oxygen to oxidize the objectionable substances. A convenient way of determining whether sufficient nascent oxygen is being supplied is to test the vent of the air pump 23 for the presence or absence of the obnoxious odors being removed from the cream under treatment. As the amount of ozone is increased, a decrease in the obnoxious odors may be noted at the vent of the air pump. The ozone supply is increased until there is an absence of the obnoxious odors at the vent and a trace of ozone odor may be noticed at the vent. We have found it best to keep the ozone concentration just sufficient to eliminate the obnoxious odors, with a barely noticeable excess of ozone at the vent of the air pump. In some tests it has been found that too much ozone appears to decrease the induction period of the fat in the treated product.

The treated product will contain sulfonic acids, which are water soluble, and other water soluble compounds which result from oxidation of the indoles, skatoles, and mercaptans and similar substances responsible for the obnoxious flavors and odors in the tainted milk product under treatment. In the subsequent churning of cream treated in this fashion, the sulfonic acids and other water soluble compounds tend to go with the buttermilk and any remaining with the butter may be removed from the butter by thoroughly washing it. Such an elimination also applies to any excess ozone which may have been dissolved in, or absorbed by, the cream undergoing treatment.

We have found that the deodorizing treatment hereinbefore described has a remarkable effect upon the induction period of the milk fat. For example, we have found that in comparison with butter made from the same source without the present treatment, the induction period of butter made from cream subjected to this treatment was at least 50% longer. These results indicate that the susceptibility of milkfat to oxidation has been substantially decreased by subjecting the cream to our process. This greatly enhances the keeping quality of butter made from such treated cream or milk.

While we have shown herein only one way of obtaining nascent or active oxygen for the oxidation of the obnoxious odors it is obvious that other ways may be employed. For example, we may use previously prepared ozone and dilute it sufficiently with air to provide the nascent oxygen. We have found, however, that pure oxygen (O₂) alone will not react sufficiently to produce the desired result.

While the preferred application of the invention is described herein, it is understood that the scope of the invention is not limited except insofar as it is limited by the claims.

Having thus described our invention, what we claim as new and desire to secure by Letters Patent is:

1. A method of deodorizing milk products which comprises heating the milk product and discharging the heated milk product in finely divided form into a vacuum chamber, circulating nascent oxygen through the finely divided product and separately withdrawing the milk product and gaseous products from the vacuum chamber.

2. A method of improving the flavor and keeping qualities of milkfats which comprises mixing the lacteal liquid containing the fats with steam under pressure and at a temperature sufficient to pasteurize the liquid, then expanding the heated mixture in a vacuum in the presence of nascent oxygen.

3. A method of improving the flavor and keeping qualities of milk fats which comprises mixing the lacteal liquid containing the fats with steam under pressure and at a temperature sufficient to pasteurize the liquid, then expanding the heated mixture in the presence of ozone.

4. A method of improving the flavor and keeping qualities of milk fats which comprises mixing the lacteal liquid containing the fats with steam under pressure and at a temperature sufficient to pasteurize the liquid, spraying the heated liquid into a vacuum chamber and circulating an ozone containing gas through the chamber.

5. A method of improving the flavor and keeping qualities of milk fats which comprises pasteurizing the lacteal liquid containing the fats by heating the same, then spraying the heated lacteal liquid into a chamber containing nascent oxygen diluted with a relatively inactive gas.

6. A method of improving the flavor and keeping qualities of milk fats which comprises neutralizing sour cream containing the fats with a soda neutralizer, heating the cream to pasteurizing temperatures, then mixing the heated cream with ozone diluted with air in a vacuum chamber at 15 to 18 inches of mercury, and separately removing the cream and vapors from the chamber.

7. In the manufacture of butter from cream, a method of improving the flavor and keeping qualities of the milk fats in the cream, said method comprising heating cream containing objectionably flavored substances to pasteurizing temperature, discharging the heated cream into a vacuum chamber and simultaneously bringing the cream into contact with ozone in the vacuum chamber, and, by bringing the objectionably flavored substances therein which are generally soluble in the milk fat and relatively insoluble in milk serum and water into contact with the ozone, thereby oxidizing the said substances and converting them into water soluble compounds which may be separated from the milk fats by washing.

8. In the manufacture of butter from cream, a method of improving the flavor and keeping qualities of the milk fats in the cream, said method comprising heating cream containing objectionably flavored substances with steam to a temperature of about 250° F. to 300° F., discharging the heated cream into a vacuum chamber thereby reducing the temperature to about 165° F. to 185° F., and simultaneously bringing the cream into contact with ozone in the vacuum chamber, and, by bringing the objectionably flavored substances therein which are generally soluble in the milk fat and relatively insoluble in milk serum and water into contact with the ozone, thereby oxidizing the said substances and converting them into water soluble compounds which may be separated from the milk fats by washing.

9. A method of treating sour cream to remove objectionably flavored substances from the milk fat therein and to improve the keeping qualities of butter made from said cream, said method comprising first adjusting the acidity of the cream to about .15% to .20% lactic acid, by adding a soda neutralizer, then heating the cream to pasteurizing temperature and discharging the hot cream into a vacuum chamber, passing nascent oxygen through the discharged cream in said chamber and thereby oxidizing certain of said substances and converting them into water soluble compounds which may be separated from the milk fats by washing.

MILTON E. PARKER.
FRED C. BRENGMAN.